May 25, 1943.  P. BAUMGARTEN  2,320,061
VEGETABLE AND FRUIT PARER
Filed Dec. 2, 1941   2 Sheets-Sheet 1
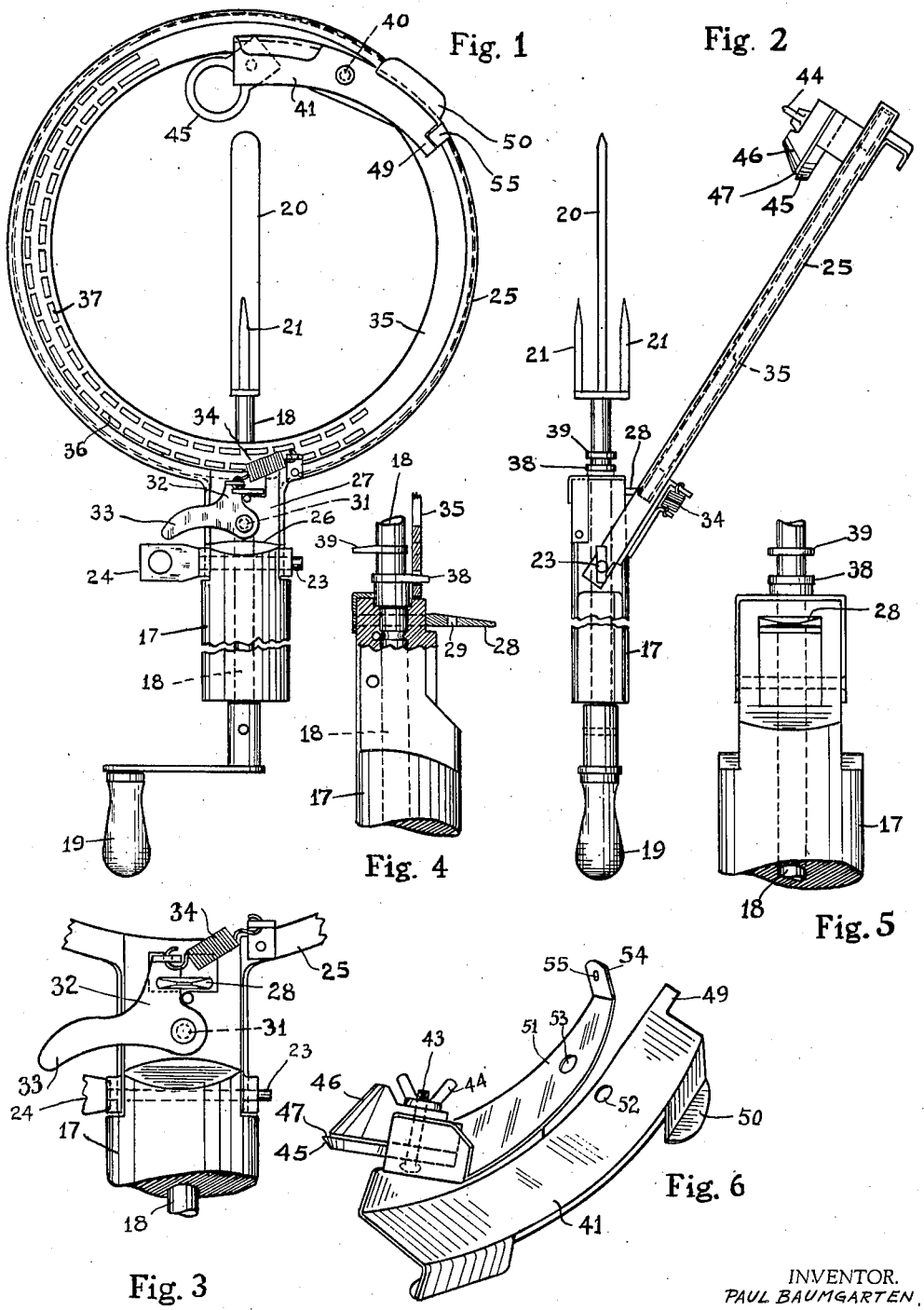
INVENTOR.
PAUL BAUMGARTEN
BY George Benjamin
ATTORNEY.

May 25, 1943.  P. BAUMGARTEN  2,320,061
VEGETABLE AND FRUIT PARER
Filed Dec. 2, 1941  2 Sheets-Sheet 2
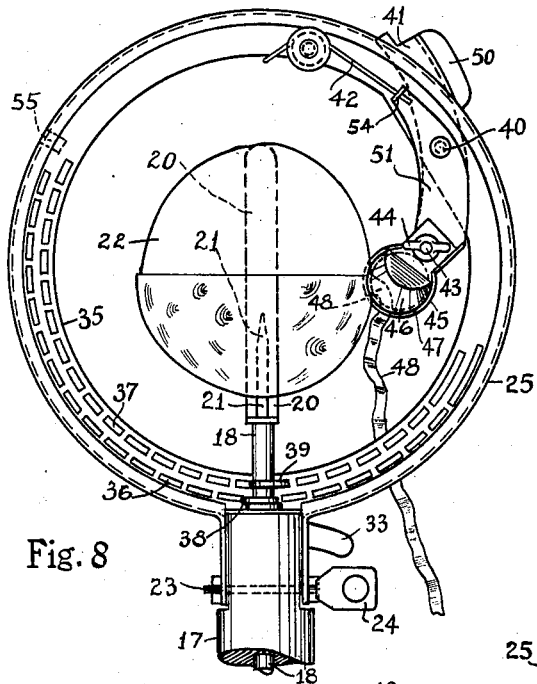
Fig. 8
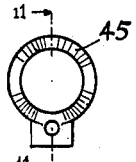
Fig. 10
Fig. 11
Fig. 12
Fig. 13
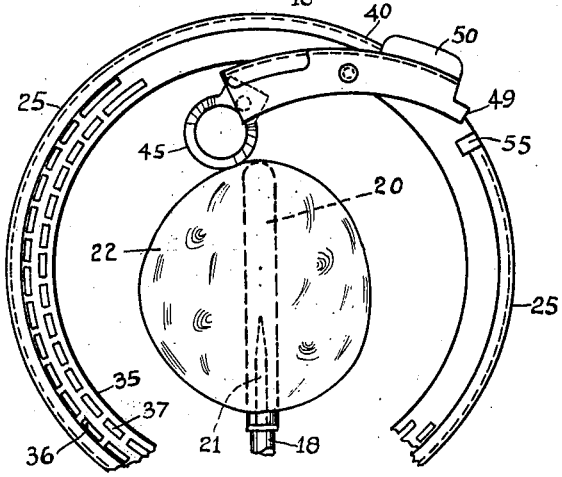
Fig. 7
Fig. 14
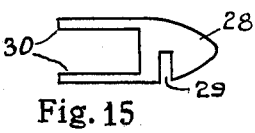
Fig. 15
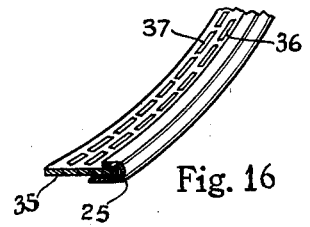
Fig. 16
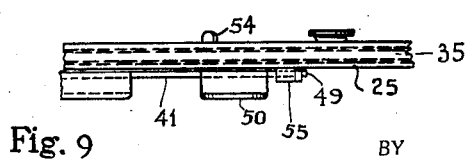
Fig. 9
INVENTOR.
PAUL BAUMGARTEN
BY George Benjamin
ATTORNEY Patented May 25, 1943

2,320,061

UNITED STATES PATENT OFFICE 2,320,061

VEGETABLE AND FRUIT PARER

Paul Baumgarten, New York, N. Y., assignor to Rudson-Wood Inc., New York, N. Y.

Application December 2, 1941, Serial No. 421,277

10 Claims. (Cl. 146—43)

The object of the invention is a machine for paring vegetables and fruit, e. g. potatoes or apples.

It is a purpose of the invention to so construct such a machine that it need not be attached to a table or the like, but can be held freely in one hand and operated by the other hand of the user.

It is a further purpose of the invention to provide some parts of such a machine with a limited swinging mobility in a peculiar manner for making easier and safer the spearing of the potato or the like onto the rotatable fruit driver. A similar swinging mobility is known by itself. According to the invention, however, the knife, its holder and its travelling support are removable away from the fruit driver, thereby making the latter accessible without any interference or danger by said other parts.

With the same object in view according to the invention the spring pressed knife is adapted to be retracted against its spring and to be locked in retracted position, but is adapted to be released automatically upon the beginning of the working movement.

Further objects and advantages of the invention will be seen from the following specification in connection with the accompanying drawings illustrating the object of the invention by way of example.

Fig. 1 is a rear elevation of the machine with the knife in retracted and locked position;

Fig. 2 is a side elevation of the machine with the frame and attached parts swung out partly;

Fig. 3 shows a part of Fig. 1 on a larger scale;

Fig. 4 is a partial side elevation of Fig. 1 on a larger scale, some parts being shown in section;

Fig. 5 is a front elevation of part of Fig. 4;

Fig. 6 is a perspective view, on a larger scale, of the knife holder, knife and depth gauge;

Fig. 7 is a partial rear elevation of the machine at the start of the work;

Fig. 8 is a partial front elevation of the machine during work;

Fig. 9 is a partial plan view of the machine;

Fig. 10 is a front elevation of the knife;

Fig. 11 is a section of the line 11—11 of Fig. 10;

Figs. 12 and 13 are a rear and a side elevation, respectively, of the depth gauge;

Fig. 14 is a bottom plan view of part of the machine with the shaft in section and with both driving cams in inoperative position;

Fig. 15 is a plan view of the frame locking tooth;

Fig. 16 is a partial perspective view of the frame and knife support.

The machine has a handle 17 by means of which one hand of the operator can hold the machine freely. In this handle is mounted a longitudinal shaft 18 rotatable, by means of a crank 19, by the other hand of the operator.

The upper end of the shaft 18 is rigidly connected or integral with a flat spear or blade 20 which, together with two lateral pins or needles 21, forms a fruit driver onto which the fruit or potato 22 is speared for being rotated thereby.

Near the upper end of the handle 17 is provided a transversal axle or pivot 23 provided with a handle 24 for easy removal. By means of this axle is pivoted to the handle 17 a circular frame 25 (Figs. 1, 2, 3, 7, 8, 9) of substantially U-shaped cross-section (Fig. 16). Around the pivot 23 the frame 25 can be swung out laterally, as shown in Fig. 2, until the lower edge 26 of an extension 27 of the frame abuts against the handle 17. In this position, not shown, the frame is inclined about 90° to the handle, and the fruit driver 20, 21 stands completely free so that it can be driven easily and securely into or through a potato 22 held upright on a table or against a wall or abutment.

For locking the frame 25 in the position of Figs. 1, 7 and 8, substantially aligned with or parallel to the handle 17, the latter is rigidly connected with a locking tooth 28 (Figs. 4 and 15) having a notch 29 and having two prongs 30 for connection with the handle. For cooperation with said tooth there is mounted on the frame extension 27, by means of a pivot 31, a latch 32 provided with a tail or handle 33 and urged clockwise (Figs. 1 and 3) against the tooth 28 by a spring 34.

In the position of Figs. 1 and 3 the tooth 28 projects through the frame extension 27, and the latch 32 engages into the notch 29 thereby locking the frame 25 in the position of Fig. 1. Depression of the tail 33 unlocks the tooth 28, whereupon the frame 25 can be swung, through the position of Fig. 2, to its tranversal position.

In the annular frame 25 is rotatably mounted an annular knife support 35 provided with a circular row of recesses 36 and with a circular row of recesses 37 concentric but staggered relative to said first mentioned row.

With the recesses 36 cooperates a driving cam 38, and with the recesses 37 cooperates a driving cam 39. These cams are rigidly connected with the shaft 18 and are offset 180° from one another so as to become operative alternately (Fig. 4).

On the annular support 35 is mounted, by means of a pivot 40, a leverlike knife holder 41, the active end of which is urged towards the fruit driver blade 20 by a spring 42.

To the holder 41 are rigidly secured, by means of a screw 43 and nut 44 (Figs. 2, 6, 8) a knife 45 and a depth gauge 46. The knife 45 (Figs. 10, 11) has the form of the mantle of a truncated cone, and the gauge 46 (Figs. 2, 12, 13) has the form of a truncated cone inverted (Figs. 2 and 6) relative to the knife cone. Between the parts 45 and 46 a substantially annular slot 47 is left for the passage of the peels or chips 48 (Fig. 8).

The knife holder 41 (Fig. 6) has, on its inactive or outer end, a tail or tooth 49 and a finger piece 50, and it is of generally V-shaped form, having a companion arm 51 so that it can straddle the frame 25 and knife support 35. The parts 41 and 51 have each a hole 52 and 53, respectively, for the passage of the pivot 40. The arm 51 has a lug 54 with a hole 55 for engagement by the spring 42.

On the frame 25 a lug 55 is provided, adapted to engage over the tooth 49 of the knife holder 41 for holding the latter in inoperative position (Fig. 1) against the force of the spring 42.

Operation:

The knife support 35 with the knife holder 41 may be supposed to be in the position of Fig. 8. Crank 19 is then adjusted to such a position that the driving cams 38, 39 take the inoperative position of Fig. 14 substantially parallel to and out of engagement with the annular knife support 35. This support, therefore, is free to be turned directly and easily by the hand of the operator, clockwise, as shown in Figs. 1 and 7, i. e. anticlockwise, as shown in Fig. 8, to the position of Fig. 1. When the support 35 is in the position of Fig. 7, or earlier, the operator presses inwardly the finger piece 50 so that the tail 49 can slip under the lug 55 (Fig. 1) whereby the knife 45 is locked in retracted position.

Now the operator depresses the tail 33 of the latch 32 thereby releasing the locking tooth 28 whereupon the frame 25 with all parts carried thereby is swung through the position of Fig. 2 to a transversal position (now shown).

A potato or the like is now speared onto the driver 20, 21, as described above, and the frame 25 is swung back to the position of Fig. 1, in which position it is held locked by the tooth 28 and latch 32.

Now the crank 19 is rotated clockwise as shown in Fig. 7. Consequently the cams 38 and 39 alternately engage the recesses 36, 37, respectively, whereby the support 35 is advanced only two steps for each full rotation of the crank 19 thereby securing a perfect paring.

The moment the support 35 is moved from the position of Fig. 1 to that of Fig. 7 the tail 49 is released by the lug 55, and the spring 42 throws the knife 45 and depth gauge 46 against the potato 22. Now paring begins with the peel 48 in the form of a ribbon escaping through the slot 47.

As soon as the knife 45 has reached the lower end of the potato, and thus completed the paring, the frame 25 is again unlocked and swung to its transversal position whereupon the potato is removed, another potato is speared, etc.

The gearing 35, 36, 37, 38, 39 gives the same desirable high rate of speed reduction as a worm wheel gearing which is much more expensive, and which does not give the extremely simple possibility for disengagement shown in Fig. 14.

For paring purposes the knife support 35 need only travel through about 180° to move the knife 45 from top to bottom of the potato.

If it is desired to reduce the pared potato itself to ribbonlike chips it may be desirable to drive the support 35 through an angle of substantially 360° or more and to cut also during the second or ascending part of the corresponding circular path. Because for the latter purpose the knife 45 would have a wrong position any of the expedients well known in planning machines may be provided i. e. a second knife for the second half of the path or a knife reversing device.

If desired any suitable spring or weight device may be provided for holding the cams 38, 39 normally in the disengaged position of Fig. 14 when idle. Ordinarily, for this purpose an adequate weight of the crank 19 will suffice.

What I claim is:

1. A vegetable and fruit parer comprising, in combination, a handle, a longitudinal shaft mounted in said handle, a member for rotating said shaft, a frame having a limited swinging mobility around an axle directed transversally to the longitudinal axis of said handle and located near one end of said handle, an annular knife support rotatably mounted in said frame, a fruit driver connected with one end of and rotatable by said shaft and projecting into the cylindrical space determined by said support, a knife holder pivoted to said support and carrying a knife, a spring tending to urge said knife towards said driver, and means for rotating said support in said frame by the rotation of said shaft, said swinging mobility being adapted to remove said knife support, said knife, said spring and said means away from said fruit driver, thereby making the latter freely accessible.

2. A parer as claimed in claim 1 in which said mobility amounts to about 90°.

3. A parer as claimed in claim 1 in which said axle is provided with a handle for withdrawing said axle and separating, thereby, said handle and driver from the rest of the machine.

4. A parer as claimed in claim 1 in which said frame is of annular form.

5. A parer as claimed in claim 1 in which locking means are provided adapted to lock said frame to said handle in a substantially common plane.

6. A parer as claimed in claim 1 in which the swinging mobility of said frame is limited by abutment thereof against said handle.

7. A parer as claimed in claim 1 in which locking means are provided, adapted to hold said knife retracted, against the urge of said spring, in a location corresponding to the work starting position of said knife support.

8. A parer as claimed in claim 1 in which locking means, adapted to hold said knife retracted, against the urge of said spring, in a location corresponding to the work starting position of said knife support, are adapted to release automatically said knife upon the start of the working rotation of said knife support.

9. A parer as claimed in claim 1 in which said means consist of two cams offset in the longitudinal direction of said shaft and offset 180° in the peripheral direction of said shaft, each of which cams is adapted to cooperate with a coordinated one of two concentric staggered circular rows of recesses provided in said knife support.

10. A parer having a knife adapted to travel in an orbital path around a work piece holder rotatable about a stationary axis, said knife having substantially the form of the mantle of a truncated cone, and a depth gauge being provided having also substantially the form of a truncated cone, a substantially annular clearance being provided between said knife and said gauge for the passage of the peeled off ribbon between said knife and said gauge.

PAUL BAUMGARTEN.